United States Patent [19]
Jungbauer et al.

[11] Patent Number: 5,859,680
[45] Date of Patent: Jan. 12, 1999

[54] ELECTRICAL ADDRESSING OF FERROELECTRIC LIQUID-CRYSTAL DISPLAYS

[75] Inventors: Dietmar Jungbauer, Weiterstadt; Heinz-Joachim Rieger, Eppstein; Claus Escher, Hofheim; Gerhard Illian, Erftstadt, all of Germany; Kazuya Nagao; Mikio Murakami, both of Kawagoe, Japan; Tsuyoshi Uemura, Kadoma, Japan; Hiroyuki Ohnishi, Ikeda, Japan; Shozo Fujiwara, Ibaraki, Japan

[73] Assignee: Hoechst Aktiengesellschaft, Frankfurt, Germany

[21] Appl. No.: 351,362

[22] PCT Filed: Jun. 21, 1993

[86] PCT No.: PCT/EP93/01574

§ 371 Date: May 1, 1995

§ 102(e) Date: May 1, 1995

[87] PCT Pub. No.: WO94/01802

PCT Pub. Date: Jan. 20, 1994

[30] Foreign Application Priority Data

Jul. 3, 1992 [DE] Germany ............ 42 21 784.9

[51] Int. Cl.$^6$ ............ G02F 1/133; G02F 1/13; C09K 19/02
[52] U.S. Cl. ............ 349/72; 349/184; 349/199
[58] Field of Search ............ 359/86, 104, 56; 349/184, 72, 199

[56] References Cited

U.S. PATENT DOCUMENTS

| | | | |
|---|---|---|---|
| 3,907,405 | 9/1975 | Fukai et al. | 350/160 |
| 3,921,162 | 11/1975 | Fukai et al. | 350/160 |
| 4,917,469 | 4/1990 | Ross | 359/86 |
| 4,923,285 | 5/1990 | Ogino et al. | 359/56 |
| 5,033,822 | 7/1991 | Ooki et al. | 359/86 |
| 5,200,848 | 4/1993 | Hanyu et al. | 359/100 |
| 5,218,352 | 6/1993 | Endoh et al. | 340/785 |
| 5,276,542 | 1/1994 | Iwayama et al. | 359/100 |
| 5,417,883 | 5/1995 | Epstein et al. | 359/99 |
| 5,541,747 | 7/1996 | Nishi et al. | 359/56 |

FOREIGN PATENT DOCUMENTS 0 440 392   8/1991   European Pat. Off. .
0 451 820  10/1991   European Pat. Off. .

OTHER PUBLICATIONS

DüBal, H.R., et al., "Electro-Optical Behaviour of Ferroelectric Liquid Crystal (FLC) Mixtures" Proceedings 6th Internation Symposium on Electrets, Oxford, GB, pp. 334–338, Sep. 1988.

Nagao, K., et al., "Temperature Dependences of Effective Cone Angles of Surface-Stabilized Ferroelectric Liquid Crystal . . . ," Japanese Journal of Applied Physics, Letters, vol. 30, No. 7A, Tokyo pp. L1189–L1191, XP000223923, Jul. 1991.

Sato, Y., et al., "High Quality Ferroelectric Liquid Crystal Display with Quasi-Bookshelf Layer Structure" Japanese of Applied Physics, Letters, vol. 28, No. 3, Tokyo, pp. L483–L486, XP000244875, Mar., 1988.

*Primary Examiner*—William L. Sikes
*Assistant Examiner*—Tiep H. Nguyen
*Attorney, Agent, or Firm*—Frommer Lawrence & Haug LLP

[57] ABSTRACT

A process for the stabilization of the spatial alignment of the smectic layers in an FLC switching and/or display element, in which the original position of the smectic layers has been modified by electrical field treatment, which comprises alternately switching the elements during non-operation and/or when a certain temperature is exceeded which is above a predetermined temperature range which includes the operating temperature region and/or when the temperature falls below a certain temperature which is below a predetermined temperature range which includes the operating temperature region. Use of the process according to the invention ensures long-term functioning of the switching and display device, even in the case of repeated regeneration of the quasi-bookshelf geometry, and prevents worsening in the contrast and brightness and the occurrence of ghost images.

10 Claims, No Drawings

ELECTRICAL ADDRESSING OF FERROELECTRIC LIQUID-CRYSTAL DISPLAYS

Switching and display devices containing ferroelectric liquid-crystal mixtures are disclosed, for example, in EP-B 0 032 362 (=U.S. Pat. No. 4,367,924). Liquid-crystal light valves are devices which modify their optical transmission properties, for example due to electrical switching, in such a way that light which is incident (and possibly reflected again) is intensity- or phase-modulated. A number of such light valves can be combined to form liquid-crystal displays (LCDs). Examples are the known watch and calculator displays or liquid-crystal displays in the OA (office automation) and TV sectors. However, these also include light shutters, as employed in photocopiers, printers, etc. So-called "spatial light modulators" are also within the area of application of liquid-crystal light valves (see Liquid Crystal Device Handbook, Nikkan Kogyo Shimbun, Tokyo, 1989; ISBN 4-526-02590-9C 3054 and the papers cited therein).

Electro-optical switching and display devices are constructed in such a way that the FLC layer is included on both sides by layers which are usually, in this sequence starting from the FLC layer, at least one alignment layer, electrodes and a limiting plate (for example made of glass). In addition, they contain a polarizer if they are operated in "guest-host" mode or in reflective mode, or two polarizers if the transmissive birefringence mode is used. The switching and display elements may, if desired, contain further auxiliary layers, such as, for example, diffusion barrier or insulation layers.

Together with a distance between the limiting plates which is chosen to be sufficiently small, such alignment layers bring the FLC molecules of the FLC mixture into a configuration in which the molecules lie with their long axes parallel to one another and the smectic planes arranged perpendicular or inclined to the alignment layer. In this arrangement, the molecules are known to have two equivalent alignments, between which they can be switched by applying an electrical field in a pulsed manner, ie. FLC displays are capable of bistable switching. The response times are inversely proportional to the spontaneous polarization of the FLC mixture and are in the range of microseconds.

The major advantage of FLC displays over the LC displays which are still the ones usually encountered in industrial practice, is regarded as being the achievable multiplex ratio, ie. the maximum number of lines which can be addressed in the time-sequential process ("multiplex process"), which is virtually unlimited in FLC displays, in contrast to conventional LC displays.

In ferroelectric liquid crystals (FLCs), practical use in displays (N. A. Clark, S. T. Lagerwall, Appl. Phys. Lett. 36 (1980) 899); K. Kondo et al. Jpn. J. Appl. Phys. 27 (1988) 464; HOE 89/F 157) requires a uniform and above all invariable alignment of the smectic layers. The layer perpendiculars are approximately parallel to the display plane; their mean direction should remain the same over the display area. The polarizers used can thereby be aligned relative to the liquid crystal so that maximum contrast and/or maximum brightness can be achieved over the entire display.

During the switching process, the molecules are switched, without a change in the layer perpendiculars relative thereto, into states which change the preferential direction of the anisotropic refractive index in the display plane. The physical ideal here is an angle change of 45° when the birefringence effect is used and 90° when guest-host mode is used.

In the alignment process during production of the display, the liquid crystal is usually heated and then recooled to room temperature. During the cooling, in particular at the transition from the smectic A phase to the smectic C phase, the smectic layer thickness generally drops and results in the so-called chevron structure (definition: T. P. Rieker et al., Phys. Rev. Lett. 59, 2658), which in turn significantly reduces the angle change of the preferential direction of the anisotropic refractive index during switching in the display and thus limits, for example, the maximum possible brightness.

One way of nevertheless achieving the maximum switching angle is so-called texture modification by means of an alternating field, in which the smectic layers angled in the chevron are aligned to give the quasi-bookshelf geometry (definition: R. Dübal, C. Escher, D. Ohlendorf, Proc. of the 6th Int. Symp. Electrets, Oxford, UK, p 344; Sato et al., Jap. J. Appl. Phys. 28, L 483 (1988)); this can be carried out, for example, at room temperature or at elevated temperature, for example the maximum operating temperature.

It has now been found that, if a display is heated and a critical temperature above the temperature of the field treatment is exceeded, the layer perpendiculars, which, until that time, were unchanged in the display plane, can tilt (Z. Zhuang, N. A. Clark, M. R. Meadows, Phys. Rev. A, 45 (10), 1992). On cooling, a chevron geometry is then formed again. On reheating without field treatment, further tilting only occurs when the maximum temperature hitherto reached in the $S_c^*$ phase after the original field treatment is exceeded. On further field treatment, however, the effect on further heating and cooling is cumulative and increases. The long-term functioning of the display is thereby greatly endangered in practice due to the worsening in contrast and brightness and due to the appearance of ghost images, which puts the technique of field treatment as a whole into question. Without field treatment, it has hitherto been impossible to observe layer tilting.

Surprisingly, it has now been found that the above-described cumulative effect is reduced if the written-in switching state is changed during the above-described cycles above a critical temperature.

The critical temperature is defined as being the temperature achieved during each of a defined number of heating cycles for which the cumulative effect of the layer tilting reaches a certain tolerance value.

The invention thus relates to a process for the stabilization of the spatial alignment of the smectic layers in an FLC switching and/or display element, in which the original position of the smectic layer has been modified by electrical field treatment, which comprises alternately switching the elements during non-operation and/or when a certain temperature is reached which is outside a predetermined temperature range which includes the operating temperature region.

Thus, the switching state can be changed at most once, for example, each time the critical temperature is exceeded. In addition, the fact that the effect is more pronounced at higher maximum temperatures reached during this operation can preferably be taken into account by weighting the switching states formed in the case of frequent exceeding of the critical temperature, depending on what maximum temperature in what switching state was achieved during the preceding heating phase.

An advantageous weighting can be effected, for example, with reference to a calibration curve which describes the change in temperature of the tilt angle of the smectic layers. This calibration curve should be determined in advance and implemented in a suitable manner, known to a person skilled in the art, in the course of the electronic control of the addressing of the light valve.

One preferred aspect of the invention relates to a process for the stabilization of the spatial alignment of the smectic layers in the display plane in an FLC switching and/or display element (display), in which an original chevron geometry of the smectic layers has been converted into a quasi-bookshelf geometry by electrical field treatment, which comprises:

(a) determining a critical temperature which is defined in such a way that the cumulative effect of the tilting of the smectic layers in the display plane reaches, for a defined number of heating cycles during which this temperature is achieved in each case, a certain tolerance value from 0° to 15°; and/or determining a critical temperature which is defined in such a way that the cumulative effect of the tilting of the smectic layers in the display plane reaches, for a defined number of cooling cycles during which this temperature is achieved in each case, a certain tolerance value determined from the impairment in contrast and brightness and the occurrence of ghost images caused by the tilting of the layers;

(b) providing the display with a permanent power supply;

(c) providing the display with a sensor which determines the temperature of the display;

(d) switching the liquid crystal alternately on reaching the critical temperature or temperatures and/or (e) providing the display with a permanent power supply and (f) in the switched-off state of the display, switching the liquid crystal alternately at a frequency of one switching change per day up to a maximum switching frequency of the liquid crystal.

Consider a series of events that lead to an overstepping of the critical temperature as being defined in the text above. For each event, the temperature might be different and, thus, the unwanted layer deviation more or less pronounced each time. If this is the case, a pixel inversion with high frequency would reduce the layer deviation. However, for reasons of power saving, one might not want to invert the pixels with high frequency, but switch only one time at most for each inversion.

In this case, the different magnitude of the layer deviation effect requires a compensation method that is different from the simple inversion of each pixel. A solution is the "weighting" of pulses in which at each time of exceeding the critical temperature the pixel is either inverted or not, depending on the pixel history.

For example, if by a large temperature variation, a large clockwise turn of the layer is obtained on a certain pixel, then the correct layer structure is recovered by a series of opposite pulses at n events, i.e. one pulse per event, for which the temperature respective layer deviation was smaller. The sum of the n counter pulses would compensate the first deviation, whereas a single counter pulse would not lead to a compensation.

Over a certain period of time, each pixel obtains a series of pulses for which either the positive or negative pulses are weighted more strongly.

According to a further preferred embodiment of the invention, the layer tilting is prevented by always changing the switching states by electrical addressing when the critical temperature is exceeded. This can be accomplished by electrical field treatment, by texture modification and/or by short switching pulses; the latter is energy saving. The time between the switching changes can be made dependent, in particular, on the temperature variation and the magnitude of the expected effect. The desired effect is more complete and reliable the higher the switching change frequency selected. On the other hand, a low switching change frequency is desirable for reasons of energy saving. During the cooling operation, at constant temperature and when a temperature above the $S_c^*$ phase is reached, further switching may be omitted for this reason. The preferred frequency range is between one switching change per day and the maximum switching frequency of the liquid crystal. After a temperature cycle, a texture modification can be effected again when the desired temperature is reached, and the original state thus restored after only one cycle. A further advantage of this method is that each pixel automatically makes the right correction, irrespective of any temperature differences between pixels; precise prior knowledge of the layer tilting during temperature changes is also unnecessary in this case.

Suitable signal shapes for the switching change are continuous (for example rectangular and sinusoidal signals) and/or pulsed electrical addressing. The addressing scheme used for the normal operation of the light valve can be used. It has furthermore been found that signals which have pause periods between the pulses of opposite polarity are sometimes more effective than those without pause periods.

The above-described switching back and forth can in principle be carried out for any screen pattern. Inversion of the image last shown is of particular quality, since the image information is retained. In addition, the operation of image inversion, at least in regular operation, indicates the situation of high temperature to the user.

The process can also be used for displays in which the bookshelf geometry is produced by shearing.

A permanent power supply, for example by rechargeable or standard batteries, is necessary for the process according to the invention in order to carry out the electrical addressing even when the display is not being used (in the "switched-off state"). The permanent power supply can also be used for other functions (clock, memory, etc.). Furthermore, the temperature and/or temperature changes of the display can be measured and/or stored by means of a sensor/sensors in order to control the process according to the invention. In the case of electronic control, the processes used must be implemented so that the novel addressing of the display can take place.

A corresponding procedure can be adopted for possible tilting of the layers on cooling to low temperatures.

The process can also be used to eliminate other undesired effects, such as the ghost effect (surface memory effect). It may therefore be advantageous to carry out the novel addressing of the display in the "switched-off state" without restricting the temperature.

Through a suitable choice of the switching change, it is also possible, if desired, to produce any particular layer tilt.

The invention furthermore relates to a device for stabilizing the spatial alignment of the smectic layers in an FLC switching and/or display element, in which the original geometry of the smectic layers has been modified by electrical field treatment, which device contains a) a permanent power supply, b) driver ICs, c) at least one temperature sensor, d) at least one control element which converts information on temperature and/or operation/non-operation of the display and/or switching states and any stored values of the calibration curve and previous history of the display into the corresponding switching change states, and, if desired, e) a memory.

Use of the process according to the invention ensures long-term functioning of the switching and display device even in the case of repeated regeneration of the quasi-bookshelf geometry, and prevents worsening in the contrast and brightness and the occurrence of ghost images.

The process according to the invention can be used in all types of optical switching and/or display devices which contain ferroelectric liquid crystals or enable electroclinic switching (definition of electroclinic switching: S. Garoff et al., Phys. Rev. Lett. 38 (1977) 848), for example in SSFLC (surface stabilized ferroelectric liquic crystal), SBF (short birefringence ferroelectric) or DHT (deformed helix ferroelectric) displays, it being possible for all of these to be operated either in guest-host mode or in birefringence mode.

The invention is explained in more detail by means of the examples:

EXAMPLES

The following FLC mixture is used for the examples: (The numerical data represent mol %)

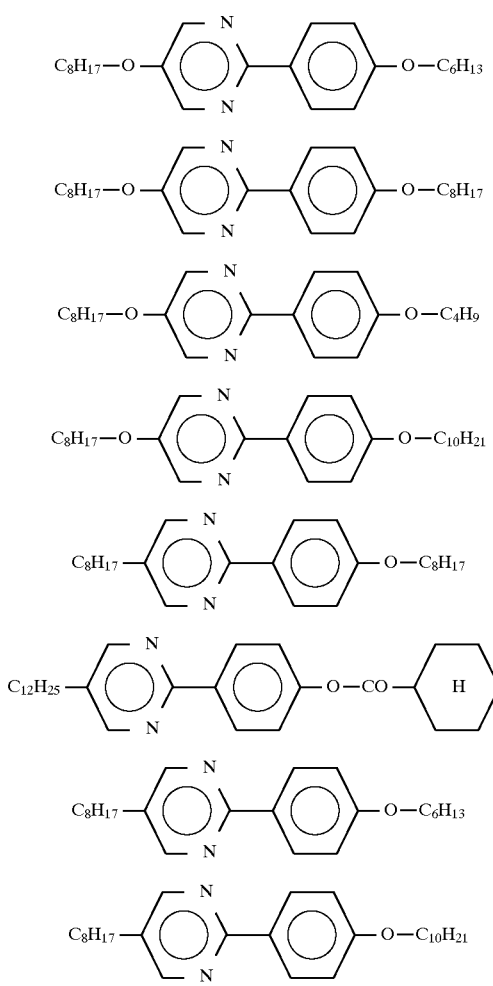

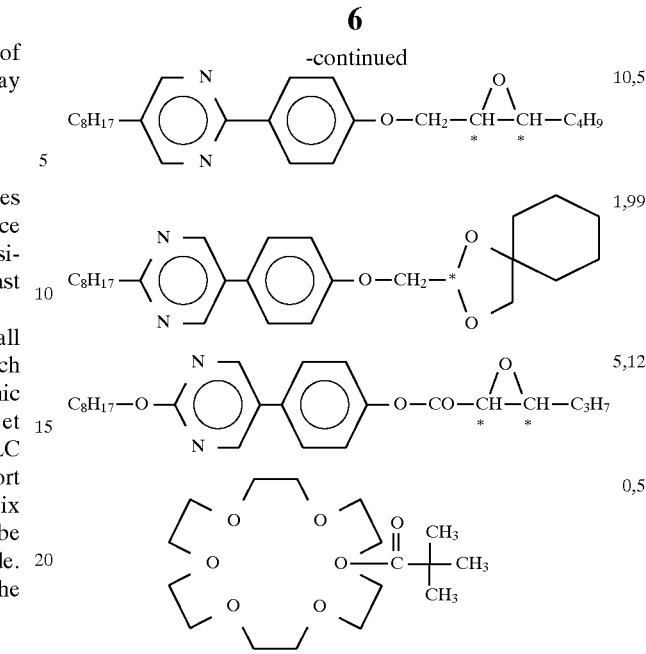

mixture has the phase sequence: $S_c^*$ 62.5 $S_A$ 69 N* 83 I.

Example 1

One of the abovementioned FLC mixtures is introduced into a 2.5 μm double-pixel cell with ITO electrodes and an alignment layer of surface-modified maleimide-styrene copolymer. The modification of the surface is carried out using the compound Z1

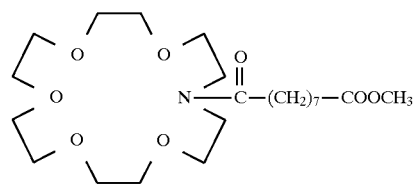

Cells of this type are described in German Patent Application P 42 12 893.5. The following heating cycles are carried out:

1st cycle: Texture modification (10 Hz, rectangular 15 V/μm, 3 min) at 25° C., both pixels switched to the dark state right-hand pixel switched by means of the addressing scheme (200 ms pulse separation/50 μs pulse width (alternating bipolar rectangular pulses))

Heating to 63.5° C. (1K above $S_c^*$–$S_A$) in 1 min, measurement of the layer tilt (LT) Cooling to 25° C., texture modification Measurement of the layer tilt (LT)

2nd cycle: as 1st cycle

3rd cycle: as 1st cycle, but heating only to 55° C. conditioning at this temperature for 17 h 4th cycle: as 1st cycle, but 2 sec pulse separation and 500 ms pulse width, heating at 6K/min The layer tilt is measured by observation under a polarizing microscope.

The results are shown in Table 1.

TABLE 1

| Layer tilt (LT) in [°] | 1st cycle | 2nd cycle | 3rd cycle | 4th cycle |
|---|---|---|---|---|
| Left-hand pixel Overall LT at high temperature | 7.3 | 15.0 | ./. | ./. |
| Left-hand pixel LT at 25° C. | | | | |
| Overall | 7.5 | 13.7 | 17.0 | 26.7 |
| Difference to previous cycle | 7.5 | 6.2 | 4.3 | 9.7 |
| Right-hand pixel Overall LT at high temperature | 0.0 | 0.0 | 0.0 | 0.0 |
| Right-hand pixel Overall LT at 25° C. | 0.0 | 0.0 | 0.1 | 0.0 |

The values obtained confirm that layer tilting is prevented when the process according to the invention is used.

Example 2

One of the abovementioned FLC mixtures is introduced into a 1.5 μm cell with ITO electrodes and an alignment layer of silicon-containing organic material.

The following heating cycles are carried out with various field shapes:

Texture modification (10 Hz, rectangular 30 V/1.5 μm, 10 sec) at 25° C.,
1st cycle: heating to 60° C. in 1 min, cooling to 25° C., texture modification, measurement of contrast ratio and layer tilt
2nd to
4th cycle: as 1st cycle
The following field shapes are used in cells 1 to 4:
Cell 1: no electrical field,
Cell 2: 2 V 100 msec pulses with a 400 msec pause between pulses of opposite polarity,
Cell 3: 3 V 100 msec continuous rectangular pulses,
Cell 4: 15 V 1 msec pulses with 99 msec pause between each cycle.
The results are shown in Table 2.

| Cell | * | After texture modification at 25° C. | 1st Cycle | 2nd Cycle | 3rd Cycle | 4th Cycle |
|---|---|---|---|---|---|---|
| 1 | CR | 200 | 70 | 30 | 20 | 10 |
|   | LT | 0 | 2.1 | 4.2 | 6.2 | 8.3 |
| 2 | CR | 200 | 190 | 190 | 190 | 190 |
|   | LT | 0 | 0 | 0 | 0 | 0 |
| 3 | CR | 200 | 120 | 100 | 90 | 80 |
|   | LT | 0 | 1.2 | 1.9 | 2.2 | 2.7 |
| 4 | CR | 200 | 20 | 20 | 20 | 20 |
|   | LT | 0 | 0.6 | 2 | 2.1 | 2.3 |

*Contrast ratio (CR)  Layer tilt (LT) in [°]

According to these results, the field shape with pauses between pulses of opposite polarity (cell 2) appears to be the most effective under these conditions.

We claim:

1. A process for the stabilization of the spatial alignment of the smectic layers in the display plane in an FLC switching and/or display element (display), in which an original chevron geometry of the smectic layers has been converted into a quasi-bookshelf geometry by electrical field treatment, which comprises:
    (a) determining a critical temperature which is defined in such a way that the cumulative effect of the tilting of the smectic layers in the display plane reaches, for a defined number of heating cycles during which this temperature is achieved in each case, a tolerance value from 0° to 15° the occurrence of ghost images caused by the tilting of the; or determining a critical temperature which is defined in such a way that the cumulative effect of the tilting of the smectic layers in the display plane reaches, for a defined number of cooling cycles during which this temperature is achieved in each case, a tolerance value from 0° to 15°;
    (b) providing the display with a permanent power supply;
    (c) providing the display with a sensor which determines the temperature of the display;
    (d) switching the liquid crystal alternately on reaching the critical temperature or temperatures or
    (e) providing the display with a permanent power supply and
    (f) in the switched-off state of the display, switching the liquid crystal alternately at a frequency of one switching change per day up to a maximum switching frequency of the liquid crystal.

2. The process as claimed in claim 1, wherein the switching state is changed at most once each time the temperature again exceeds the critical temperature.

3. The process as claimed in claim 1, wherein the frequency of the switching states formed is weighted.

4. The process as claimed in claim 1, wherein the switching states are always changed again above and/or below the critical temperature(s).

5. The process as claimed in claim 1, wherein the switching and/or display element is only switched alternately in the case of rising temperature after the critical temperature is exceeded and only in the temperature range of the $S_c^*$ phase.

6. The process as claimed in claim 1, wherein the switching and/or display element is only switched alternately in the case of falling temperature after the temperature falls below the critical temperature.

7. The process as claimed in claim 1, wherein the liquid crystal is switched alternately in the switched-on state of the switching and/or display device with a frequency of one switching change per day up to a maximum switching frequency of the liquid crystal.

8. The process as claimed in claim 1, wherein the signals for the switching change of the liquid crystal have pause periods between pulses of opposite polarity.

9. A device for stabilizing the spatial alignment of the smectic layers in the display plane in an FLC switching and/or display element (display), in which an original chevron geometry of the smectic layers has been converted into a quasi-bookshelf geometry by electrical field treatment by a process as claimed in claim 1, which device contains
    a) a permanent power supply,
    b) driver ICs,
    c) at least one temperature sensor which compares the temperature of the display with the critical temperature (s),
    d) at least one control element which converts information on temperature and/or operation/non-operation of the display and/or switching states and any stored values of a calibration curve and the previous history of the display into the corresponding switching change states, and, if desired,
    e) a memory.

10. An FLC switching and/or display element containing a device as claimed in claim 9.

* * * * *